Patented Jan. 6, 1948

2,433,844

UNITED STATES PATENT OFFICE 2,433,844

ORGANIC FLUOROETHERS AND THEIR PREPARATION

William Edward Hanford, Easton, Pa., assignor to E. I. du Pont de Nemours & Company, Wilmington, Del., a corporation of Delaware No Drawing. Application April 23, 1943,
Serial No. 484,299

8 Claims. (Cl. 260—338)

This invention relates to the preparation of fluorinated organic compounds and to new organic fluorine compounds. More particularly, the invention comprises a new process for the preparation of polyfluoroether compounds and includes new chemical products consisting of saturated organic ether compounds containing one or more polyfluoroethylene groups per molecule.

Heretofore the usual method for preparing organic fluorine compounds consisted in reacting halogenated organic compounds with hydrogen fluoride or with metallic fluorides. However, such processes yield a mixture of products, involve considerable expense, and their application is restricted to certain types of halogenated organic compounds.

It has also previously been proposed to produce organic fluorine compounds by the reaction of fluorine with various organic materials. Prior investigations have shown that this reaction of fluorine results in vigorous or explosive reactions, accompanied by charring and decomposition of the organic reactant. Accordingly, the direct action of fluorine on organic materials has not been useful as a means for preparing organic fluorides.

It is an object of this invention to provide a new process for the preparation of saturated organic polyfluoroether compounds. Another object of this invention is to obtain new compositions of matter consisting of fluorinated organic compounds containing an ether linkage. Still another object is to prepare fluoroether compounds which have outstanding thermal and chemical stability. A further object is to provide a process for readily preparing saturated organic ether compounds containing one or more polyfluoroethylene groups per molecule without using dangerous or expensive inorganic reagents. A still further object is to obtain saturated organic fluorine ether compounds possessing many novel and useful properties. Other objects will appear hereinafter.

These objects are accomplished by reacting a polyfluoroethylene containing at least three halogen atoms of which at least two are fluorine with a saturated organic compound containing an ether linkage. By saturated is meant that the compound containing the ether linkage is free of ethylenic and acetylenic unsaturation. This reaction produces saturated organic polyfluoroether products containing at least one polyfluoroethylene unit per molecule of ether reactant. The prefix "poly-" as used herein refers to the number of fluorine atoms present in the fluoroethylene molecule and not to polymeric materials.

A preferred form of the invention may be carried out by reacting tetrafluoroethylene with a saturated organic compound containing an ether linkage, preferably in a closed system and in the presence of a catalyst. Saturated organic polyfluoroether compounds are obtained containing one or more tetrafluoroethylene units per molecule of ether compound. These resulting products may be represented by the general formula $H(CF_2CF_2)_nQ$ where $n$ is a positive integer in the range 1 to about 25, and Q is the complementary portion of the ether reactant, being a monovalent saturated organic radical containing at least one ether linkage.

The polyfluoroethylenes suitable for use in this invention may be represented by the general formula $CX_2=CX_2$ where one X is selected from the group consisting of hydrogen and halogen and the other three X's are halogen of which at least two are fluorine.

Saturated organic ether compounds suitable for use in this invention contain at least one

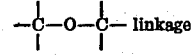 linkage

These saturated organic ether compounds may be acyclic, cyclic, or heterocyclic, including ordinary ethers ROR, acetals $RHC(OR)_2$ and ketals $R_2C(OR)_2$ where R is a member selected from the group consisting of alkyl, cycloalkyl, alkaryl, aralkyl and aryl radicals. The general formula QH may be used to represent these organic ether compounds where Q is the complementary portion of the ether reactant, being a monovalent saturated organic radical containing at least one

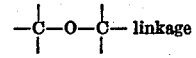 linkage

The saturated organic fluorinated ether compounds prepared in accordance with this invention may be represented by the general formula $H(CX_2CX_2)_nQ$ where $n$ is a positive integer in the range 1 to about 25, one X is selected from the group consisting of hydrogen and halogen, the other three X's are halogen of which at least two are fluorine and Q is the complementary portion of the ether reactant, being a monovalent saturated organic radical containing at least one

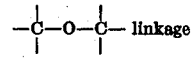 linkage

In these products the carbon of the polyfluoroethylene unit is directly connected through a carbon atom or a chain of carbon atoms to the ether unit. In the preferred products $n$ is a positive integer in the range 1 to 15.

It is also possible to obtain products in which all of the fluoroethylene units are not necessarily connected together and which may be represented by the general formula $$H(CX_2CX_2)_{n-m}\text{—}T\text{—}(CX_2CX_2)_mH$$

where $n$ is a positive integer in the range 1 to about 25, $m$ is not greater than $n$ and is an integral number in the range from 0 to about 25, one X in each parenthesis is selected from the group consisting of hydrogen and halogen, and the other three X's in each parenthesis are halogen of which at least two are fluorine and T is the complementary portion of the ether reactant, being a divalent saturated organic radical containing at least one

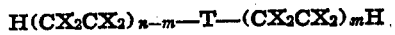

It is to be understood that the units in parenthesis correspond to the particular fluoroethylene which is employed in the reaction, although tetrafluoroethylene is the preferred reactant. The sum total of the atoms other than the fluoroethylene units is equivalent to only one molecule of the original organic ether compound. Thus the saturated organic ether compounds in this invention react with a fluorocarbon, such as tetrafluoroethylene, to yield a series of saturated organic polyfluoro ether compounds.

The following specific example is given to further illustrate the invention:

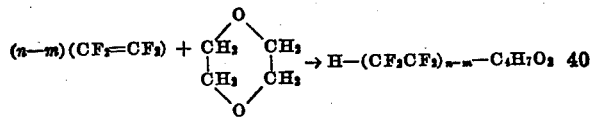

This product may react with additional tetrafluoroethylene as illustrated below:

$$H(CF_2CF_2)_{n-m}\text{—}C_4H_7O_2 + m(CF_2=CF_2) \rightarrow$$
$$H(CF_2CF_2)_{n-m}\text{—}C_4H_6O_2\text{—}(CF_2CF_2)_m\text{—}H$$

Further reaction with tetrafluoroethylene may also occur. Thus the most general formula representing the new saturated polyfluoroether product is $H(CX_2CX_2)_{n-m}\text{—}T'$ where one X is selected from the group consisting of hydrogen and halogen and the other three X's are halogen of which at least two are fluorine, $n$ is the total number of $(CX_2CX_2)$ groups in the compound and is a positive integer in the range 1 to about 25, $m$ is the number of $(CX_2CX_2)$ groups contained in T' and is an integral number in the range 0 to about 25 but is not greater than $n$, and T' is a monovalent saturated organic radical containing $m(CX_2CX_2)$ groups and at least one

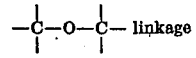

The method for carrying out the reactions varies to some extent with different types of organic ethers, but the usual procedure comprises charging a given amount of an organic ether and a polyfluoroethylene, such as tetrafluoroethylene, with or without a catalyst, into a stainless steel or silver-lined high pressure reaction vessel and then closing and heating to the desired temperature for several hours.

In order to prepare the low molecular weight products which are characteristic of this invention, it is usually desirable to carry out the reactions under pressure at elevated temperatures. The temperature at which the reaction is effected may be varied over a wide range, depending largely upon the nature of the reactants, the catalyst, the results desired, and other conditions of the reaction. However, the temperature should be below that at which decomposition or pyrolysis of either the reactants or products occurs. No appreciable reaction is obtained below 50° C. and it is usually necessary to heat the reaction mixture to 75° C. or higher in order to obtain a substantial reaction in a reasonable time. The preferred temperature range is 75° to 300° C., but higher temperatures below the pyrolysis temperature are sometimes desirable.

A series of products are usually obtained which vary from liquids to solids depending upon the organic ether and the number of polyfluoroethylene units per molecule of product. The products have a relatively low molecular weight, vary from liquids to solids, and contain one or more units of polyfluoroethylene per unit of ether. The liquid products are usually compatible with the common organic solvents whereas the solid products have a rather limited solubility in most solvents.

The invention is further illustrated by the following examples in which the parts are by weight unless otherwise specified.

*Example I*

A silver-lined high pressure reaction vessel was flushed with nitrogen and charged with 154 parts of dioxane (which had been freshly distilled from sodium) and 1.5 parts of benzoyl peroxide. The reaction vessel was evacuated and pressured with tetrafluoroethylene to give 350 lbs./in.² at 110° C. After heating for a short time, the autoclave was cooled and the excess gas bled off. The liquid reaction mixture was steam distilled to yield 34 parts of steam-volatile, water-insoluble liquid heavier than water. The liquid was separated, dried, and fractionally distilled through an efficient packed column to yield a series of products in which the percentage of fluorine increased with increase in boiling point.

|  | F | O | H | Ratio $(C_2F_4)/C_4H_8O_2$ |
|---|---|---|---|---|
|  | Per cent | Per cent | Per cent |  |
| Analysis of fraction boiling at 144°–162° C | 39.23 | 38.58 | 4.49 |  |
| Calculated for 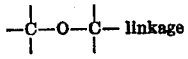 | 40.4 | 38.3 | 4.26 | 1/1 |
| Analysis of fraction boiling at 200°–204° C | 53.90 | 28.90 | 2.52 |  |
| Calculated for $H\text{—}(C_2F_4)_2\text{—}C_4H_7O_2$ | 52.8 | 33.3 | 2.78 | 2/1 |

Example II

A mixture of 158 parts of 1,3-dioxolane and 1.5 parts of benzoyl peroxide was charged into an autoclave and after evacuating and pressuring with tetrafluoroethylene to 350 lbs./in.$^2$ at 110° C., the mixture was heated with agitation for about 8.75 hours. The reaction mixture was cooled and the pressure released. On steam distilling the reaction mixture, 10 parts of steam-volatile, water-insoluble liquid heavier than water and a small amount of nonsteam-volatile sticky solid were obtained. Fractional distillation of the liquid products gave a series of products with increasing percentage of fluorine with increase in boiling point.

|  | F | C | H | Ratio $(C_2F_4)/(CH_3OCH_2)_2$ |
|---|---|---|---|---|
|  | Per cent | Per cent | Per cent |  |
| Analysis of fraction boiling at 141°–151° C | 41.46 | 37.28 | 4.98 |  |
| Calculated for $C_8H_{10}F_4O_2$ | 40.0 | 37.9 | 5.27 | 1/1 |
| Analysis of fraction boiling at 180°–190° C | 51.89 | 29.83 | 3.25 |  |
| Calculated for $C_8H_{10}F_8O_2$ | 52.4 | 33.1 | 3.45 | 2/1 |
| Analysis of fraction boiling at 64°–72° C./2.5 mm | 55.77 | 29.47 | 2.70 |  |
| Calculated for $C_{10}H_{10}F_{12}O_2$ | 58.4 | 30.75 | 2.57 | 3/1 |
| Analysis of fraction boiling at 91°–121° C./2.5 mm | 60.24 | 27.46 | 1.92 |  |
| Calculated for $C_{12}H_{10}F_{16}O_2$ | 62.0 | 29.4 | 2.04 | 4/1 |

Example III

A mixture of 100 parts of dioxane, 200 parts of tetrafluoroethylene, and oxygen equivalent to a partial pressure of ¼ an atmosphere was charged into an autoclave and heated about 8 hours at 100° C. There was obtained 64 parts of a waxy product which was slightly soluble in hot acetic acid and dioxane.

|  | F | C | H | Average Ratio $(C_2F_4)/C_4H_8O_2$ |
|---|---|---|---|---|
|  | Per cent | Per cent | Per cent |  |
| Analysis of waxy product | 64.59 | 25.55 | 1.22 |  |
| Calculated for $(C_2F_4)_6/C_4H_8O_2$ | 66.3 | 27.9 | 1.16 | 6/1 |

Example IV

One hundred and fifty parts of dioxane and 1.5 parts of benzoyl peroxide were reacted with tetrafluoroethylene under a pressure of 1000 lbs./in.$^2$ at 110° C. for 9 hours in a stainless steel autoclave. There was obtained 251 parts of semi-solid reaction mixture which on steam distillation yielded 22.5 parts of volatile water-insoluble liquid heavier than water and 106 parts of waxy nonsteam-volatile solid melting at about 170°–175° C. This waxy solid was found to exhibit lubricating properties.

The above procedure was repeated except that the tetrafluoroethylene was added to give a pressure of 700 lbs./in.$^2$ at 110° C. A yield of 67 parts of steam-volatile liquid products and 23 parts of nonsteam-volatile waxy solid products melting at about 155°–160° C. was obtained.

Example V

A mixture of 100 parts of sym-dimethoxyethane, 1.5 parts of benzoyl peroxide, and 100 parts of tetrafluoroethylene was heated 9 hours at 110° C. in a silver-lined autoclave. After cooling and releasing the pressure, the 124 parts of slightly viscous reaction mixture was steam distilled to yield 56 parts of steam-volatile, water-insoluble liquid, 7.8 parts of steam-volatile waxy solid melting at about 80° C., and 5.6 parts of nonsteam-volatile waxy solid melting at about 120° C. The liquid products were fractionally distilled through an efficient column and the percentage of fluorine was found to increase with increase in boiling point from the 1/1 to the 4/1 tetrafluoroethylene/dimethoxyethane reaction products.

Example VI

One hundred and fifty parts of sym-dimethoxyethane and 1.5 parts of benzoyl peroxide were charged into an autoclave and after evacuating, tetrafluoroethylene was added by means of an injection system to give a pressure of 1000 lbs./in.$^2$ at 110° C. The autoclave was heated with agitation at 110° C. for 9 hours and tetrafluoroethylene was added frequently in order to maintain the pressure at about 1000 lbs./in.$^2$ during the run. The autoclave was cooled and the pressure released. On steam distillation of the reaction mixture, 32 parts of steam-volatile liquid, a small amount of steam-volatile solid, and 30 parts of nonsteam-volatile waxy solid melting at about 145°–150° C. were obtained.

Example VII

On repeating Example IV using 1.5 parts of lauroyl peroxide instead of benzoyl peroxide, 37.5 parts of steam-volatile liquid products, and 18 parts of nonsteam-volatile waxy solid melting at about 250° C. were obtained.

The fractional distillation of the combined steam-volatile liquid products from several runs gave the following results:

| Boiling Point, ° C. | Ref. Ind. $\eta_D^{20° C.}$ | Amount, Parts | Ratio, $C_2F_4/C_4H_8O_2$ |
|---|---|---|---|
| 148.3–152.3 | 1.3700 | 6 |  |
| 153–157 | 1.3677 | 7 | 1/1 |
| 184–189 | 1.3560 | 6 |  |
| 59/5 mm | 1.3562 | 11 | 2/1 |
| 83–90/5 mm | 1.3484 | 11 | 3/1 |

Example VIII

One hundred and seventy-six parts of 2-methyl-2-chloro-methyl-1,3-dioxolane and 1.5 parts of benzoyl peroxide were charged into a stainless steel autoclave and after evacuating, the autoclave was pressured to 350 lbs./in.² with tetrafluoroethylene and heated at 110° C. for 9.2 hours. The reaction mixture was steam-distilled and the unreacted 2-methyl-2-chloro-methyl-1,3-dioxolane removed by fractional distillation. There was obtained 20 parts of steam-volatile liquid products, a small amount of steam-volatile solid, and 3 parts of nonsteam-volatile waxy solid melting at about 130° C. Fractional distillation of the liquid products yielded a series of fractions in which the percentage of fluorine increased and percentage of chlorine decreased with increase in boiling point.

| Boiling Point | Analysis | | Ratio $C_2F_4/C_3H_5ClO_2$ |
|---|---|---|---|
| | Cl | F | |
| | Per cent | Per cent | |
| 180°–196° C. | 21.78 | 23.94 | |
| Calculated for $C_7H_9F_4ClO_2$ | 15.0 | 32.15 | 1/1 |
| 72°–79° C./5 mm | 11.75 | 37.09 | |
| Calculated for $C_9H_9F_8ClO_2$ | 10.54 | 45.2 | 2/1 |
| 85°–91° C./5 mm | 9.90 | 47.57 | |
| Calculated for $C_{11}H_9F_{12}ClO_2$ | 8.13 | 52.3 | 3/1 |

Example IX

A mixture of 150 parts of acetal, 1.5 parts of benzoyl peroxide, and 50 parts of tetrafluoroethylene was reacted in a stainless steel autoclave for 8 hours at 110° C. There was obtained about 45 parts of liquid steam-volatile products and about 1.5 parts of nonsteam-volatile dark waxy solid. The liquid products were separated by fractional distillation to yield a series of fluorine-containing products.

F, Per cent
Analysis of fraction boiling at 122°–140° C__ 41.67
Analysis of fraction boiling at 80°–96° C./30 mm _____ 55.97

Example X

A mixture of 90 parts of methylal, 100 parts of tetrafluoroethylene, and 1.5 parts of benzoyl peroxide was heated in an autoclave at 110° C. for 8 hours. The reaction mixture was steam distilled and yielded 3.1 parts of water-insoluble steam-volatile liquid products heavier than water, 1.1 parts of steam-volatile solid melting at about 78° C., and 17.6 parts of nonsteam-volatile solid melting at about 212° C.

| | F | C | H | Ratio $(C_2F_4)/CH_2(OCH_3)_2$ |
|---|---|---|---|---|
| | Per cent | Per cent | Per cent | |
| Analysis of nonsteam-volatile solid melting at about 212° C. | 68.18 | 25.5 | 0.94 | |
| Calculated for $C_{17}H_8F_{24}O_2$ | 68.5 | 26.3 | 1.03 | 7/1 |
| Analysis of liquid fraction boiling at about 50° C./2 mm | 57.6 | 26.75 | 2.44 | |
| Calculated for $C_9H_8F_{12}O_2$ | 60.6 | 28.7 | 2.13 | 3/1 |

Example XI

A mixture of 150 parts of dimethyl ether of tetraethylene glycol, 1.5 parts of benzoyl peroxide, and 50 parts of tetrafluoroethylene was reacted in an autoclave at 110° C. for 9 hours. Steam distillation of the reaction mixture yielded 2.9 parts of steam-volatile liquid products, heavier than water, and 5.7 parts of viscous oily nonsteam-volatile products, heavier than water all of which contained fluorine.

Example XII

A silver-lined autoclave was evacuated and charged with 100 parts of ethylene oxide, 100 parts of tetrafluoroethylene, and 1.5 parts of benzoyl peroxide. The autoclave was closed and heated at 100° C. for 8.5 hours. Steam distillation of the solid reaction mixture gave a small amount of steam-volatile, water-insoluble liquid and 17.3 parts of nonsteam-volatile solid melting at about 292° C.

Example XIII

One hundred and twenty parts of diethyl ether which had been freshly distilled from sodium and 1.5 parts of benzoyl peroxide were charged into a silver-lined autoclave and the autoclave cooled and evacuated. After pressuring to 350 lbs./in.² with tetrafluoroethylene, the autoclave was heated 8.5 hours at 110° C. Six parts of liquid products were obtained boiling above 84° C. and the percentage of fluorine was found to increase with increase in boiling point.

| | F | C | H | Ratio $(C_2F_4)/(C_2H_5)_2O$ |
|---|---|---|---|---|
| | Per cent | Per cent | Per cent | |
| Fraction boiling at 97.5°–104° C. | 41.43 | 43.06 | 6.64 | |
| Calculated for $C_6H_{10}F_4O$ | 43.7 | 41.4 | 5.74 | 1/1 |
| Fraction boiling at 158°–158.5° C. | 55.60 | 33.04 | 3.70 | |
| Calculated for $C_8H_{10}F_8O_2$ | 55.45 | 35.0 | 3.64 | 2/1 |

Among the polyfluoroethylenes which are applicable in this invention are trifluorochloroethylene, difluorodichloroethylene, trifluorobromoethylene and trifluoroethylene. However, polyfluoroethylenes containing three fluorine atoms react more readily than the difluoroethylenes. Tetrafluoroethylene is particularly preferred as it reacts the most readily.

The preferred saturated organic ethers are those containing at least two ether linkages such as acetals, ketals, dioxolane, dioxane, and sym-dimethoxyethane. However, the invention is applicable to other saturated organic ethers such as those which contain one either linkage, for example, dimethyl ether, diethyl ether, dibutyl ether, methyl ethyl ether, methyl hexyl ether, methyl methoxyacetate, ethylene oxide, tetrahydrofuran, pentamethylene oxide, anisole and phenetole. The aliphatic ethers are preferred as they react more readily than the aromatic ethers. Particularly preferred are the ethers which contain more than one ether linkage as they react the most readily. These include methylal, diethyl acetal, dimethylheptal, sym-dimethoxy, sym-diethoxy-, and sym-dibutoxyethanes, dimethyl ether of tetraethylene glycol, dioxane, 1,3-dioxolane, 2-methyl-1,3-dioxolane, 2,2-dimethyl-1,3-dioxolane, 4-methyl-1,3-dioxolane, 2-methyl-2-chloromethyl-1,3-dioxolane, polyethylene oxide, cellulose, methyl cellulose, ethyl cellulose, benzyl cellulose, starch, methyl starch and acetals of polyvinyl alcohol. Of the compounds mentioned above, those having the ether linkages as the only functional groups are preferred as the possibility of side reactions is decreased.

It is often desirable to use a catalyst, although a catalyst is not always necessary. A wide variety of catalysts are operable including organic and inorganic peroxygen compounds, alkaline catalysts, and various acid type catalysts. The peroxygen type catalysts are preferred for use in this invention and examples of them are diacyl peroxide, benzoyl peroxide, lauroyl peroxide, ethyl peroxide, sodium peroxide, hydrogen peroxide, barium peroxide, oxygen, ozone, air, and ammonium persulfate. Examples of alkaline catalysts for use in this invention are borax, disodium phosphate, sodium alcoholate, hydrazine, hydrazine salts, trimethylamine oxide, hexachloroethane-trimethylamine oxide, hexachloroethane, hexachloroethane-borax and peroxide-borax. Among the acid type catalysts which may be used in this invention are Friedel-Crafts type catalysts, zinc chloride and phosphoric acid.

The proportion of catalyst may vary within relatively wide limits depending largely upon the nature of the reactants and the products desired. Although efficient reaction may be effected without the use of catalysts, it is generally preferred to employ a catalyst in this invention. Furthermore, the use of small amounts of catalyst reduces the temperature, time and cost of operation. Highly desirable results may be obtained with the use of an amount of catalyst corresponding to about .001 to 10.0% by weight of the reactants employed. Advantageous results are also sometimes obtained by using a combination of catalysts.

Although a mixture of saturated organic ethers may be employed in this invention, it is preferable to use a single saturated organic ether. It is also preferable that the organic ethers not be contaminated with other type organic compounds which might result in undesirable side reactions. Generally, a relatively large molar excess of the organic ether is used as compared to the more expensive polyfluoroethylene in order to prepare low molecular weight products. However, the desired products may often be obtained by using a relatively small amount of the organic ether since the ratio of polyfluoroethylene units per unit of organic ether in the products varies from 1 to about 25, depending upon the conditions. Usually the molar ratio of organic ether to polyfluoroethylene in the reaction mixture may vary from .04 to 20, but it is preferable to work in the range .1 to 10 in order to obtain the low molecular weight products which are characteristic of this invention.

It will be understood that the operating conditions may vary widely depending upon the nature of the compounds being reacted and also upon the results desired. The time required for carrying out the reactions may vary from a few minutes to several days depending upon the nature of the reactants and the other operating conditions such as temperature, pressure and catalyst.

The process may be operated continuously or intermittently. The reaction may be carried out in a closed system or the reaction may be carried out in the vapor phase by mixing the vapors of the organic ether and polyfluoroethylene and passing the mixture of vapors through a hot reaction tube which if desired may contain a catalyst. The reaction may be carried out under subatmospheric, atmospheric or superatmospheric pressure in the range of .1 to 1000 atmospheres. The preferred pressure range is 1 to 200 atmospheres.

Although there is no objection to the presence of small amounts of water in carrying out the process of this invention, it is preferable that the reaction be conducted under substantially anhydrous conditions. However in certain cases, the presence of water may be advantageous to help dissipate the heat of the reaction.

The reaction may be carried out in any suitable reaction vessel such as iron, steel, stainless steel, silver, aluminum, Monel metal, copper and other metals and alloys which are capable of withstanding heat and pressure. The reaction is preferably carried out with agitation, although agitation is not always necessary.

The present invention is useful for the production of a wide variety of organic fluoroethers. Although it is understood that usually a mixture of compounds with varying ratios of fluoroethylene units per ether molecule is obtained, the mixture can generally be separated into various definite fractions by various methods such as steam distillation, fractional distillation, extraction and fractional crystallization. Products with a given ratio of polyfluoroethylene units per ether molecule can often be prepared by the proper choice of conditions and catalyst. Increase in pressure favors an increase in molecular weight and thus a higher ratio of fluoroethylene units per molecule of product.

The products can readily be distinguished from the reactants by analysis and by their physical properties. In general, the stability and specific gravity of the products increase and the refractive index decreases with increase in percentage of fluorine in the products. The products of this invention vary from liquids to relatively low molecular weight solids which usually soften or melt below 300° C. when heated in air on a copper block. The liquid products are generally compatible with the common organic solvents but the solid products have a rather limited solubility in most solvents.

The reaction and the separation or isolation of the products may be carried out simultaneously or in separate steps. The products may be separated by filtration, extraction, distillation or crystallization, depending upon the nature of the products.

The products of this invention are useful for various commercial purposes. Since all of the products of this invention are extremely stable, they are generally applicable for use as solvents and reaction media. Many of the products have been found to be very desirable in that they are substantially nonflammable, noncorrosive and non-toxic. The saturated organic fluoroether products of this invention are useful as lubricants, heat transfer media and dielectrics since they have outstanding thermal and chemical stability.

This invention is particularly advantageous in that it affords a safe, flexible, practical and economical process for producing highly fluorinated saturated organic ethers. One of the advantages of this invention is that the process may be operated with none or a relatively small amount of catalyst and the reaction proceeds smoothly and easily without undesirable side reactions.

As many apparently widely different embodiments of this invention may be made without departing from the spirit and scope thereof, it is to be understood that I do not limit myself to the specific embodiments thereof except as defined in the appended claims.

I claim:

1. A mixture of organic polyfluoro-compounds having the general formula $H(CX_2CX_2)_nQ$ where one X is selected from the group consisting of hydrogen and halogen and the other three X's are halogen of which at least two are fluorine, $n$ is a positive integer in the range from 1 to 7 for the component of the mixture most closely approximating the average, and HQ is an aliphatically saturated organic ether compound.

2. A mixture of organic polyfluoro-compounds having the general formula $H(CF_2CF_2)_nQ$ where $n$ is a positive integer in the range from 1 to 7 for the component of the mixture most closely approximating the average, and HQ is an aliphatically saturated organic ether compound.

3. A mixture of organic polyfluoro-compounds having the general formula

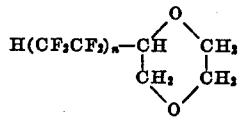

where $n$ is a positive integer in the range from 1 to 6 for the component of the mixture most closely approximating the average.

4. A process for the production of organic fluorine compounds which comprises reacting in the presence of a peroxygen catalyst a polyfluoroethylene containing at least three halogen atoms of which at least two are fluorine with an aliphatically saturated organic ether compound at a temperature above 50° C. and below 300° C.

5. A process for the production of organic fluorine compounds which comprises reacting under pressure in the presence of a peroxygen catalyst a polyfluoroethylene containing at least three halogen atoms of which at least two are fluorine with an aliphatically saturated organic ether compound at a temperature between 75° and 300° C.

6. A process for the production of organic fluorine compounds which comprises reacting in the presence of a peroxygen catalyst tetrafluorethylene with an aliphatically saturated organic ether compound at a temperature above 50° C. and below 300° C.

7. A process for the production of organic fluorine compounds which comprises reacting in the presence of a peroxygen catalyst tetrafluoroethylene with an aliphatically saturated organic ether compound containing at least two ether linkages at a temperature between 75° and 300° C.

8. The process for obtaining an organic fluorine compound, which comprises heating tetrafluoroethylene with dioxane under pressure at a temperature within the range of from 75° C. to 300° C. in the presence of benzoyl peroxide, the mol ratio of said dioxane to said tetrafluoroethylene being within the range of from 0.1:1 to 10:1.

WILLIAM EDWARD HANFORD.

REFERENCES CITED

The following references are of record in the file of this patent:

UNITED STATES PATENTS

| Number | Name | Date |
|---|---|---|
| 1,976,224 | Hermann | Oct. 9, 1934 |
| 2,024,749 | Scott | Dec. 17, 1935 |
| 2,230,654 | Plunkett | Feb. 4, 1941 |
| 2,255,487 | Feagin | Sept. 9, 1941 |

FOREIGN PATENTS

| Number | Country | Date |
|---|---|---|
| 523,449 | Great Britain | Jan. 15, 1940 |